United States Patent [19]

Zollinger

[11] Patent Number: 5,265,132
[45] Date of Patent: Nov. 23, 1993

[54] VACUUM TOOL MANIPULATOR

[76] Inventor: William T. Zollinger, 3927 Almon Dr., Martinez, Ga. 30907

[21] Appl. No.: 833,216
[22] Filed: Feb. 10, 1992
[51] Int. Cl.$^5$ .............................................. G21C 19/00
[52] U.S. Cl. ....................................... 376/260; 376/310
[58] Field of Search ................. 376/260, 262, 308, 310

[56] References Cited

U.S. PATENT DOCUMENTS

| | | | |
|---|---|---|---|
| 3,336,202 | 8/1967 | Lockett et al. | 176/30 |
| 3,843,184 | 10/1974 | Horton, III | 294/66 A |
| 3,897,878 | 8/1975 | Peberdy | 214/18 |
| 4,330,369 | 5/1982 | Anderson | 376/268 |
| 4,610,838 | 9/1986 | Gasparro et al. | 376/310 |
| 4,910,823 | 3/1990 | Silverman et al. | 15/1 |
| 4,959,146 | 9/1990 | Kristan | 376/310 |
| 4,995,138 | 2/1991 | Pullen | 15/340 |
| 5,011,206 | 4/1991 | Guironnet | 294/86.41 |
| 5,087,411 | 2/1992 | Guironnet et al. | 376/310 |
| 5,164,151 | 11/1992 | Shah et al. | 376/260 |

*Primary Examiner*—Donald P. Walsh
*Assistant Examiner*—Frederick H. Voss
*Attorney, Agent, or Firm*—Brian R. Tumm; Harold M. Dixon; William R. Moser

[57] ABSTRACT

Apparatus for manipulating a vacuum hose in a reactor vessel comprises a housing with two opposing openings, an arm carried by the housing and deployable from a stowed position essentially completely within the housing to an extended position where the arm extends through the two openings in a generally horizontal position. The arm preferably has a two-fingered gripping device for gripping the vacuum hose but may carry a different end effector such as a grinding wheel. The fingers are opened and closed by one air cylinder. A second air cylinder extends the device. A third air cylinder within the housing pivotally pulls the opposing end of the arm into the housing via a pivoting member pivotally connected between the third air cylinder shaft and the arm.

11 Claims, 3 Drawing Sheets

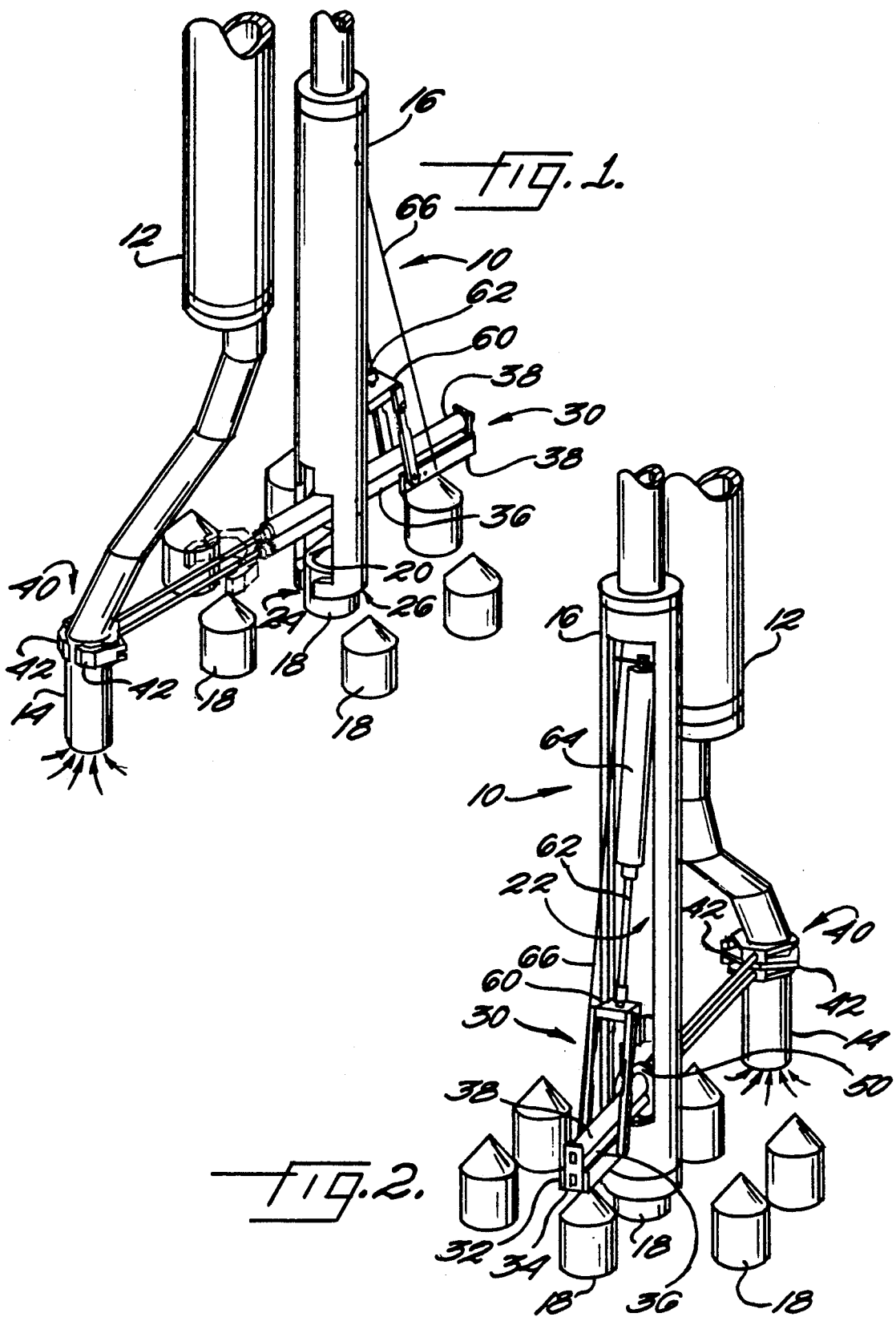

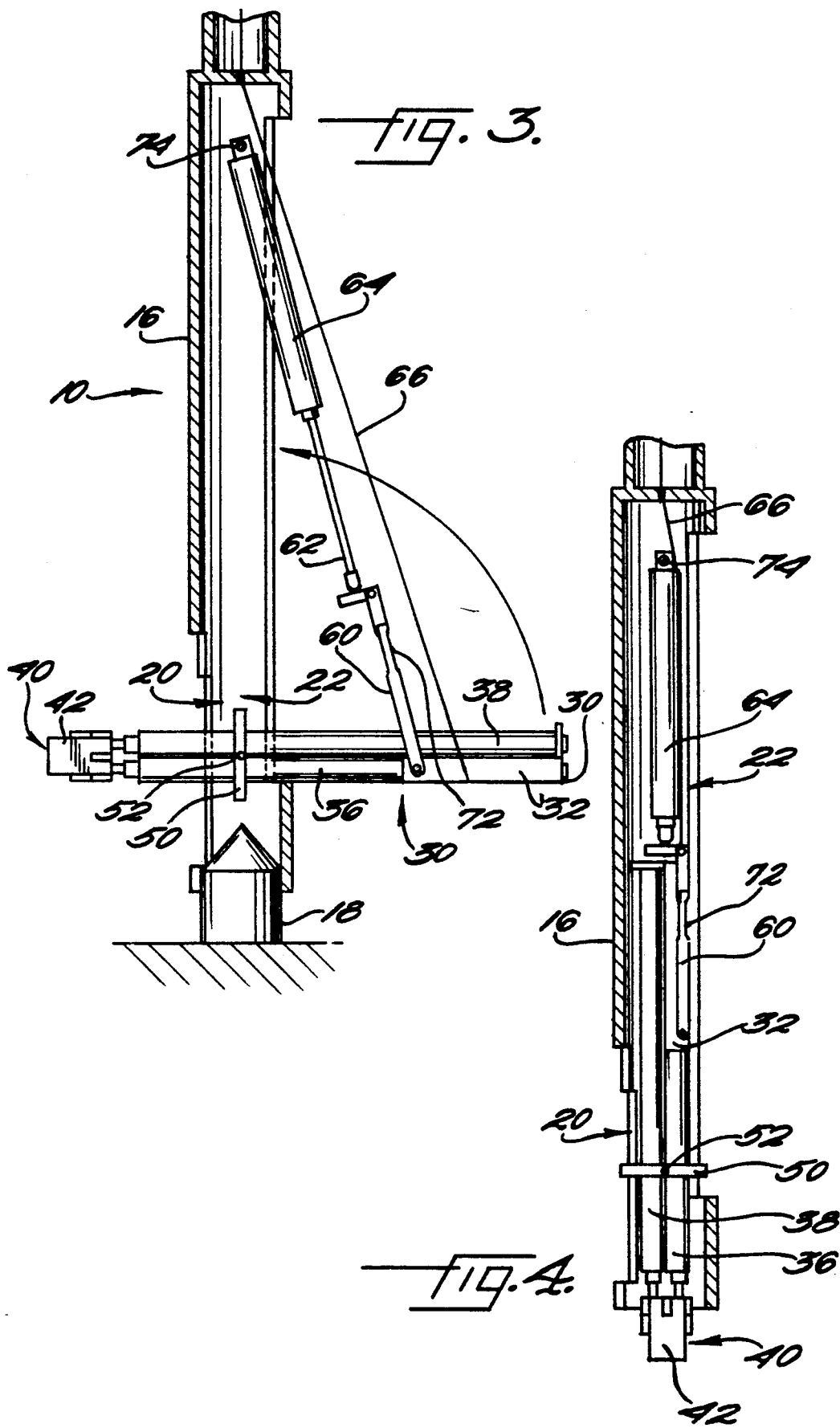

VACUUM TOOL MANIPULATOR

The U.S. Government has rights in this invention pursuant to Contract No. AC09-89SR18035 between the U.S. Department of Energy and Westinghouse Savannah River Company.

BACKGROUND OF THE INVENTION

1. Field of the Invention

The present invention relates to manipulating apparatus. More particularly, the present invention relates to a manipulator for vacuum hoses inside reactor pressure vessels.

2. Discussion of Background

A nuclear reactor facility typically has several areas where radioactive materials are stored or used. These areas are in the form of tanks, pools or vessels where the radioactive materials are kept under water that serves as both shielding and coolant, and additionally enables the radioactivity to be attenuated with the increased distance to operators who perform reactor and material operations. In the course of operations and handling of these materials, debris and tools may fall to the floor of these various areas and need to be retrieved or removed periodically to maintain the clarity of the water. Vacuuming is the removal method of choice for all but the largest items. Thorough vacuuming requires a systematic approach so that all areas are reached by the vacuum hose. Because of suspended material in the water, it is not always easy to see the floor to vacuum in a systematic way.

In some reactors, the design of the pressure vessel and its internal components are such that there is little room for the introduction and removal of vacuum equipment and any apparatus related to vacuuming or other operations that may from time to time be required inside a pressure vessel. One such pressure vessel design is a production reactor having an upper plenum with plugs for sealing access holes to each fuel assembly. At the bottom of this type of pressure vessel, on a lower plenum, are monitoring pins on which the fuel assemblies rest.

A particular criterion of manipulators sent into pressure vessels is the need to assure that apparatus introduced to the vessel can be removed in the event of a mechanical or electrical failure. This is especially important where the aperture to the vessel interior is small. If a particular apparatus fails and cannot be removed the way it was brought in, the consequences may be severe; a portion of the vessel may need to be dismantled or the apparatus cut up into smaller pieces remotely.

There are several apparatus for removing debris from the bottom of a pressure vessel or spent fuel pool, including apparatus that manipulate objects. See in particular the apparatus disclosed by Pullen in U.S. Pat. No. 4,995,138 and by Silverman et al. in U.S. Pat. No. 4,910,823. In addition there are other manipulators that meet specialized requirements, such as the extraction device of Guironnet disclosed in U.S. Pat. No. 5,011,206 and Horton, III's marine search and salvage system disclosed in U.S. Pat. No. 3,843,184. None of these apparatus, however, are designed to enter a small opening in an upper plenum and vacuum a large area of a pressure vessel in a systematic way and to do so with built-in, fail-safe features in the event the apparatus suffers a mechanical or electrical breakdown or is damaged in use.

SUMMARY OF THE INVENTION

According to its major aspects and broadly stated, the present invention is an apparatus for manipulating a reactor vacuum hose to remove dirt and debris from the bottom of a nuclear reactor pressure vessel. The apparatus fits through a small hole in the top plenum of the reactor and seats onto a monitoring pin on the lower plenum so that lateral movement of the apparatus is prevented but the manipulator is otherwise free to rotate and thereby, systematically, to maneuver the vacuum hose about the area adjacent to the pin.

The apparatus comprises a housing having a first opening and an opposing second opening, and an arm deployably attached within the housing. The arm has a gripping device on one end with two or more fingers for gripping the vacuum hose. The arm has a stowed position, wherein the arm is folded and essentially completely enclosed within the housing, and a deployed position, wherein the arm extends through the first and second openings for use.

The arm further comprises a frame with two ends. The first end of the frame carries the gripping device and is pivotally attached to the housing. The other end of the frame is free to rotate about the first end. An actuator with a shaft and a pivoting member is pivotally attached within the housing. The pivoting member is connected near the second end of the frame so that, when the actuator pulls the shaft and the pivoting member, the second end of the frame is rotated about the first end into the housing. The frame also carries a pair of actuators, one actuator for extending and one for operating the gripping device. If the actuator in the housing should fail, a cable is provided to facilitate manual stowing of the arm. Furthermore, the apparatus is designed and made with weakened areas in its structure to allow it to be cut for disassembly and removal in the event of damage to or complete failure of the apparatus.

In an alternative embodiment of the present invention, the gripping device may be replaced with a different end effector, such as a grinding wheel. In the case of a grinding wheel, the arm is stiffened against rotation about the axis of the wheel.

An important feature of the present invention is the combination of the dual, opposing openings and the arm deployment mechanism. The dual openings allow one end of the frame to be rotated in and out of the housing and the actuators on the frame to extend and operate the gripping device through the other opening. This combination enables the apparatus to be compact and yet have a good range of operation.

Another feature of the present invention is the combination of the pair of actuators carried by the frame and the gripping device. One actuator extends the device from the frame and the other opens and closes the gripping device's fingers. For compactness, the actuators, which are preferably air cylinders, are placed in parallel on the frame.

The position of connection of the pivoting member with the frame is another feature of the present invention. The pivoting member is near but not at the end of the frame so that the frame is held horizontally at a distance above the floor of the pressure vessel so that the gripping device clears the other monitoring pins.

The cable for pulling the arm back into the housing and the weakened points of the frame are two important features of the present invention. The consequences of not being able to retrieve the apparatus are severe. By simply providing the cable most potential retraction problems are overcome. If the apparatus is damaged to the point where even cable-retraction of the arm will not allow it to be retrieved, the apparatus can be cut into small pieces at the weakened places and withdrawn through the hole in the upper plenum.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a front, perspective view of a vacuum hose manipulator according to a preferred embodiment of the present invention showing the arm in the extended position;

FIG. 2 is a rear, perspective view of the vacuum hose of FIG. 1;

FIG. 3 is a side, cross-sectional view of the manipulator of FIG. 1 with the arm in the extended position;

FIG. 4 is a side, cross-sectional view of the manipulator of FIG. 1 with the arm in stowed position;

DETAILED DESCRIPTION OF A PREFERRED EMBODIMENT

Figure 6:
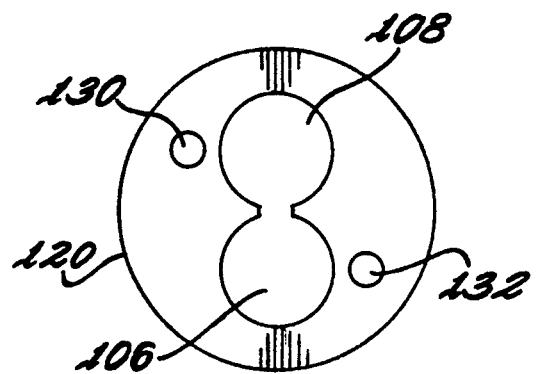
FIG. 6 is a detail of the stiffened collar for the alternative embodiment shown in FIG. 5.

Referring now to FIGS. 1 and 2 which illustrate front and rear perspective views of an apparatus according to the present invention, there is a manipulator 10 shown in a pressure vessel adjacent to a vacuum tool 12 with a vacuum hose 14. Manipulator 10 has a housing 16 with an outer configuration shaped and dimensioned to slide through an opening in the upper plenum of the reactor (not shown), cylindrical in this instance. On the lower plenum, at the bottom of the pressure vessel are monitoring pins 18, one of which is used as a base for securing housing 16 against lateral movement. Since housing 16 is cylindrical and dimensioned to receive a cylindrical pin 18, manipulator 10 is free to rotate azimuthally.

Housing 16 has two openings: a first opening 20 and an opposing, second opening 22. First opening 20 is relatively smaller then second opening 22 and has a cutout portion 24 through to the end of housing 16 at 26. Second opening 22 is relatively larger so that it can accommodate a folding arm 30.

Arm 30 has a frame 32 for supporting two actuators, a first actuator 36 and a second actuator 38. First and second actuators 36, 38 hold a gripping device 40 with at least two fingers 42, with two opposing fingers shown in FIGS. 1 and 2. First actuator 36 controls the extending and retracting of gripping device 40 and second actuator 38 controls the opening and closing of fingers 42. Actuators 36, 38 are preferably air cylinders disposed in parallel to each other, and dimensioned to fit through first and second openings 20, 22.

Towards one end of first and second actuators 36, 38 is a bracket 50 (see FIG. 3), holding actuators 36, 38 in position and alignment and carrying a pivot pin 52 perpendicular to the long axis of actuators 36, 38. The ends of pivot pin 52 are rotatably seated in housing 16 so that bracket 50, together with actuators 36, 38, can rotate freely, gripping device 40 moving into and out of housing 16 when fingers 42 are retracted, or when fingers 42 are extended so long as manipulator 10 is not seated on pin 18.

At the other end of first and second actuators 36, 38, frame 32 is pivotally attached to a pivoting member 60 which is in turn attached to a shaft 62 slidably seated in a third actuator 64. Third actuator 64 is pivotally secured within housing 16 near the top. Third actuator 64 pulls and pushes shaft 62 and, with it, pivoting member 60 and frame 32. As actuator 64 pulls shaft 62, first end 34 of frame 32 is raised and rotated about pivot pin 52 into second opening 22.

FIGS. 3 and 4 show manipulator 10 in the extended position (as in FIGS. 1 and 2) and in the stowed position, respectively. Rotation of arm 30 about pivot pin 52 pulls gripping device 40 into first opening 20 and frame 32 into second opening 22. In the pivot, shaft 62 slides into actuator 64 and pivoting member 60 pivots about a pivot pin 72 in frame 32 to align itself with the long axis of frame 32. Actuator 64 pivots about a pivot pin 74 to the vertical position. In the stowed position (FIG. 4), manipulator 10 has a narrow profile which can be easily withdrawn through a small-diameter hole.

In the event actuator 64 fails (or the air supply to it fails), a cable 66 is provided, connected at one end to frame 32 and leading up through housing 16, to pull arm 30 into the stowed position. In the event of a more complete failure, manipulator 10 can be cut into pieces that will fit in a hole of the same diameter as the original, uncut manipulator. To facilitate cutting, manipulator 10 has "weakened" places in its structure at 70 and 72, places where the material that forms manipulator 10 has been deliberately reduced in strength so that cutting can be done quickly and with minimal effort.

In use, manipulator 10 is inserted into a pressure vessel and seated on a monitoring pin 18. Arm 30 is deployed from its stowed position to the extended position, with frame 32 extending through second opening 22 and gripping device 40 through first opening 20. The fingers 42 of gripping device 40 grasp vacuum hose 14. Manipulator 10 rotates on monitoring pin 18. When in the extended position, arm 30 is horizontal and clears the tops of other monitoring pins 18. The operator can systematically maneuver vacuum hose 14 to vacuum the entire area by retracting and extending vacuum hose 14 with first actuator 36, and rotating manipulator 10 on monitoring pin 18.

Figure 5:
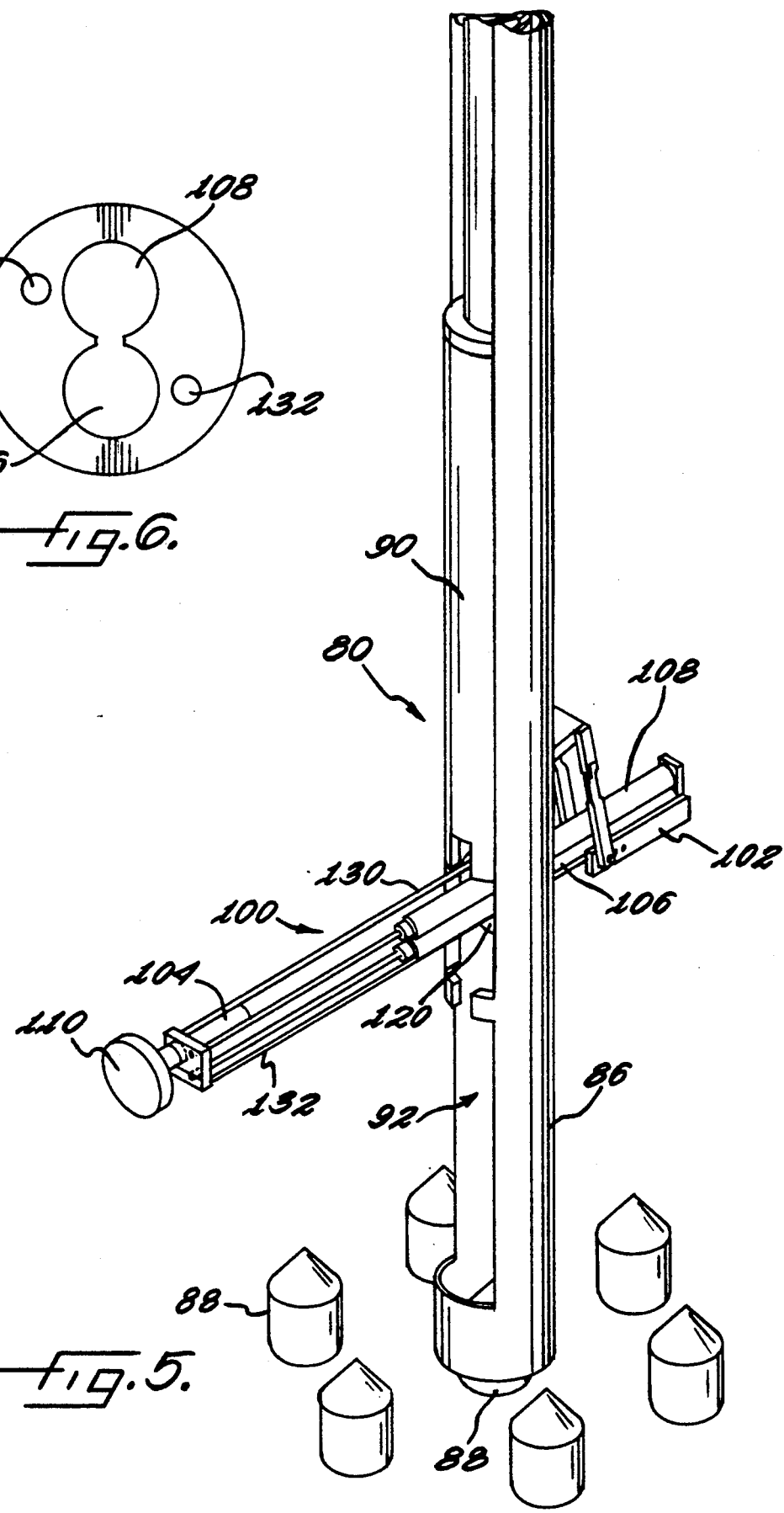
FIG. 5 is a perspective view of an alternative embodiment according the present invention with a grinding wheel in place of the gripping device.

FIGS. 5 and 6 illustrate an alternative embodiment of the present apparatus, one with a different end effector, as will be described. In FIG. 5 there is a manipulator 80 similar to manipulator 10 of FIG. 1. Manipulator 80 also has an external housing 86 that seats on one of several monitoring pins 88 of the lower plenum of a reactor vessel to secure it against lateral movement. Inside external housing 86 is a housing 90 similar to housing 16 of manipulator 10. Manipulator 80 is free to rotate azimuthally, as manipulator 10 is, and to move vertically as housing 90 slides vertically within external housing 86.

Housings 86 and 90 also have two openings: a smaller first opening with a cutout portion (not shown), as does manipulator 10, and a larger, opposing second opening 92 to accommodate a folding arm 100.

Arm 100, as with arm 30, has a frame 102 for supporting two actuators, a first actuator 106 and a second actuator 108. First and second actuators 106, 108 hold a grinding wheel or brush 110 rather than a gripping device. First and second actuators 106, 108 control the extending and retracting of grinding wheel or brush 110 and an air motor 104 controls its rotation.

Towards one end of first and second actuators 106, 108 is a bracket 120 (FIG. 6) that carries a pivot pin perpendicular to the long axis of actuators 106, 108. The ends of pivot pin 122 are seated in housing 86 and 90 so that bracket 120, together with actuators 106, 108, can rotate freely, grinding wheel or brush 110 moving into and out of housing 86 retracted and extended so long as manipulator 80 is not seated on pin 88. To prevent arm 100 from twisting when grinding wheel or brush 110 is operating, two stiffening rods 130, 132 are used (see also FIG. 6), running through bracket 120 from grinder 110 to frame 102.

It will be apparent to those skilled in the art that many changes and substitutions can be made to the preferred embodiment herein described without departing from the spirit and scope of the present invention as defined by the appended claims.

What is claimed is:

1. An apparatus for manipulating a vacuum hose in a reactor pressure vessel, said apparatus comprising:
    a housing having a first opening and an opposing second opening;
    means formed in said housing for seating said apparatus within said vessel, said seating means allowing rotation of said apparatus about a major axis but restricting lateral movement;
    an arm having a first end and a second end, said arm deployably attached within said housing so that said arm can extend through said first and said second openings when deployed, said arm having a stowed position wherein said arm is essentially completely within said housing, and a deployed position wherein said arm extends through said first and said second openings;
    a gripping device having two opposing fingers, said gripping device attached to said first end of said arm, said gripping device adapted for gripping said vacuum hose; and
    means for deploying said arm, said deploying means attached to said housing.

2. The apparatus as recited in claim 1, wherein said arm further comprises:
    a frame;
    a first actuator for extending said gripping device from said frame, said first actuator carried by said frame; and
    a second actuator for opening and closing said two fingers, said second actuator carried by said frame.

3. The apparatus as recited in claim 1, wherein said deploying means further comprises:
    a third actuator pivotally connected within said housing;
    a pivot member having a first end pivotally attached to said actuator and a second end pivotally attached to said arm,
    said third actuator pivoting said pivot member so that said arm can rotate between said stowed position and said deployed position.

4. The apparatus as recited in claim 1 further comprising a cable extending from said housing to said second end of said arm for moving said arm from said deployed position to said stowed position.

5. The apparatus as recited in claim 1, further comprising means formed in said apparatus for weakening said apparatus structurally, said apparatus being easily cut at said weakening means.

6. The apparatus as recited in claim 1, wherein said arm further comprises:
    a frame;
    a first actuator for extending said gripping device from said frame, said first actuator carried by said frame;
    a second actuator for opening and closing said two fingers, said second actuator carried by said frame; and
    said deploying means further comprises a third actuator pivotally connected within said housing, said third actuator rotating said arm between said stowed and said deployed positions.

7. The apparatus as recited in claim 1, wherein said arm further comprises:
    a frame;
    a first actuator for extending said gripping device from said frame, said first actuator carried by said frame; and
    a second actuator for opening and closing said two fingers, said second actuator carried by said frame; and said deploying means further comprises:
    a third actuator pivotally connected within said housing; and
    a pivot member having a first end pivotally attached to said actuator and a second end pivotally attached to said arm, said third actuator pivoting said pivot member so that said arm can rotate between said stowed position and said deployed position.

8. The apparatus as recited in claim 1, further comprising
    a cable extending from said housing to said second end of said arm for moving said arm from said deployed position to said stowed position; and
    means formed in said apparatus for weakening said apparatus structurally, said apparatus being easily cut at said weakening means.

9. An apparatus for manipulating a vacuum hose in a reactor pressure vessel, said apparatus comprising:
    a housing having a first opening and an opposing second opening;
    means formed in said housing for seating said apparatus within said vessel, said seating means allowing rotation of said apparatus about a major axis but restricting lateral movement;
    a gripping device having two opposing fingers, said gripping device adapted for gripping said vacuum hose;
    an arm having a first end and a second end, said gripping device attached to said first end of said arm, said arm deployably attached within said housing so that said arm can extend through said first and said second openings when deployed, said arm having a stowed position wherein said arm is essentially completely within said housing, and a deployed position wherein said arm extends through said first and said second openings; and
    a cable extending from said housing to said second end of said arm for moving said arm from said deployed position to said stowed position.

10. The apparatus as recited in claim 9, wherein said arm further
    a frame;
    a first actuator for extending said gripping device, said first actuator carried by said frame; and a second actuator for opening and closing said at least two fingers, said second actuator carried by said frame.

11. The apparatus as recited in claim 10, wherein a deploying means further comprises a third actuator pivotally connected within said housing; and a pivot member having a first end pivotally attached to said third actuator and a second end pivotally attached to said arm, said third actuator pivoting said pivot member so that said arm can rotate between said stowed position and said deployed position.

* * * * *